US012665670B2

(12) United States Patent

Lutz

(10) Patent No.: US 12,665,670 B2
(45) Date of Patent: Jun. 23, 2026

(54) OPTICAL COMMUNICATION LINK WITH REMOTE OPTICALLY PUMPED AMPLIFIER

(71) Applicant: ADVA Optical Networking SE, Meiningen OT Dreissigacker (DE)

(72) Inventor: Rapp Lutz, Munivh (DE)

(73) Assignee: ADTRAN NETWORKS SE, Meiningen OT Dreissigacker (DE)

( * ) Notice: Subject to any disclaimer, the term of this patent is extended or adjusted under 35 U.S.C. 154(b) by 400 days.

(21) Appl. No.: 18/132,946

(22) Filed: Apr. 10, 2023

(65) Prior Publication Data

US 2023/0327765 A1 Oct. 12, 2023

(30) Foreign Application Priority Data

Apr. 12, 2022 (EP) .................................... 22168027

(51) Int. Cl.
*H04B 10/25* (2013.01)
*H04B 10/07* (2013.01)

(52) U.S. Cl.
CPC ....... *H04B 10/25891* (2020.05); *H04B 10/07* (2013.01)

(58) Field of Classification Search
CPC .......................... H04B 10/25891; H04B 10/07
See application file for complete search history.

(56) References Cited

U.S. PATENT DOCUMENTS

| | | | | |
|---|---|---|---|---|
| 4,699,452 A | * | 10/1987 | Mollenauer ........ | H04B 10/2916 |
| | | | | 385/39 |
| 5,278,686 A | * | 1/1994 | Grasso ............. | H04B 10/07955 |
| | | | | 359/341.43 |
| 5,321,707 A | * | 6/1994 | Huber ................ | H04B 10/2912 |
| | | | | 372/6 |

(Continued)

FOREIGN PATENT DOCUMENTS

| | | |
|---|---|---|
| WO | WO 2017/098230 A1 | 6/2017 |
| WO | WO 2021/126674 A1 | 6/2021 |

OTHER PUBLICATIONS

European Search Report corresponding to EP Patent Application No. 22168027.5 dated Nov. 10, 2022.

*Primary Examiner* — Kenneth N Vanderpuye
*Assistant Examiner* — Asif Shameem
(74) *Attorney, Agent, or Firm* — Jenkins, Taylor & Hunt, P.A.

(57) ABSTRACT

A bidirectional optical communication link, OCL, (1) comprising a first optical transmission link, OTL1, adapted to transmit an optical signal from a near-end location (NEL) via a first optical fiber (2-1) to a remote-end location (REL); and a second optical transmission link, OTL2, adapted to transmit an optical signal from the remote-end location (REL) via a second optical fiber (2-2) to the near-end location(NEL); wherein at least one of the optical transmission links, OTL1, OTL2, comprises a remote optically pumped amplifier, ROPA, (3-1, 3-3) having a gain medium which is pumped with pump light received by that gain (Continued)

medium through a third optical fiber (4) from a pump laser source provided at the near-end location (NEL) or provided at the remote-end location (REL) to supply the gain medium of the remote optical pump amplifier, ROPA, (3-1, 3-2) with pump power.

16 Claims, 6 Drawing Sheets

(56) References Cited

U.S. PATENT DOCUMENTS

| | | | | |
|---|---|---|---|---|
| 5,903,385 A * | 5/1999 | Sugaya | H04B 10/2935 | 359/337 |
| 6,583,899 B1 * | 6/2003 | Casanova | H04B 10/07955 | 398/9 |
| 6,614,968 B1 * | 9/2003 | Eslambolchi | G02B 6/4469 | 385/100 |
| 6,674,566 B2 * | 1/2004 | Fludger | H04B 10/2916 | 359/337.2 |
| 8,081,880 B2 * | 12/2011 | Papernyi | H04B 10/298 | 398/136 |
| 10,498,438 B2 * | 12/2019 | Xu | H04B 10/0777 | |
| 12,244,337 B2 * | 3/2025 | Patterson | H04B 10/07 | |
| 2008/0075459 A1 | 3/2008 | Wang et al. | | |
| 2008/0152352 A1 * | 6/2008 | Papernyi | H04B 10/298 | 398/157 |
| 2010/0183305 A1 * | 7/2010 | Chang | H04B 10/2916 | 398/67 |
| 2012/0224168 A1 * | 9/2012 | Hirai | H04B 10/0791 | 356/73.1 |
| 2023/0059478 A1 * | 2/2023 | DiGiovanni | H01S 3/094053 | |

* cited by examiner

OPTICAL COMMUNICATION LINK WITH REMOTE OPTICALLY PUMPED AMPLIFIER

PRIORITY CLAIM

This application claims the benefit of European Patent Application No. 22168027.5, filed Apr. 12, 2022, the disclosure of which is incorporated herein by reference in its entirety.

FIELD OF THE INVENTION

The invention relates to a bidirectional optical communication link with optical transmission links, OTLs, at least one of them including at least one remote optically pumped amplifier (ROPA) having a gain medium which is pumped with pump light.

TECHNICAL BACKGROUND

Optical communication links use optical fibers, which guide light for data transmission. Different kinds of optical fibers can be used to establish an optical communication link. A hollow core fiber (HCF) is an optical fiber which guides light essentially within a hollow region so that only a minor portion of the optical power does propagate in a solid fiber material formed typically of glass. Hollow core fibers (HCFs) offer low latency and are therefore promising candidates for high-speed data communication applications with reduced delay. However, hollow core fibers have typically higher attenuation losses than conventional standard single mode fibers (SSMFs). Consequently, intermediate signal amplification between two network nodes of a communication network along the communication link is required when using hollow core fibers. However, there is typically no power supply or air conditioning available at the respective sites.

When using conventional standard single mode fibers, signal amplification in the transmission optical fiber of the optical communication link can be achieved by stimulated Raman scattering (SRS). However, this amplification mechanism requiring nonlinear interaction with the material of the optical fiber is not suitable for hollow core fibers. The use of remote optically pumped amplifiers requires the transmission of pump light to the optical amplifier. However, providing pump power via a transmission fiber formed by a hollow core fiber is not efficient due to stronger increasing losses outside of a target wavelength range of the transmission fiber used for data signal transmission. In conventional optical data communication systems, remote optically pumped amplifiers used in unrepeated single span applications are provided with pump power via the transmission fiber. In the transmission fiber, the pump light is travelling with a pump lightwave in opposite direction to the optical signals. Because of the high attenuation losses of hollow core fibers, it is only possible to supply remote optically pumped amplifiers ROPAs which are located in proximity of the optical pump power source. However, most optical data communication systems require longer optical communication links.

Remote optically pumped amplifiers (ROPAs) are characterized in that the gain medium and the pump laser source are incorporated in different enclosures that are connected via at least one optical fiber such that laser safety is not provided by the enclosures alone. Typically, the fiber distance between the remote optically pumped amplifier ROPA comprising the gain medium and the pump source amounts to at least 500 m, preferably more than 1 km, preferably even more than at least 10 km.

Conventional ROPA solutions provide pump power to a gain medium of a remote optically pumped amplifier via a transmission fiber. Laser safety by a standard laser safety mechanism of the optical communication system is illustrated in FIG. 1. FIG. 1 shows a standard laser safety shutdown mechanism in a bidirectional fiber optical communication system. The bidirectional fiber optical communication system shown in FIG. 1 comprises a first optical transmission link OTL1 for transmitting an optical signal from a near-end location, NEL, via a first optical fiber to a remote-end location, REL. The bidirectional fiber optical communication system shown in FIG. 1 comprises a second optical transmission link OTL 2 adapted to transmit an optical signal from the remote-end location, REL, via a second optical fiber to the near-end location, NEL. In the illustrated embodiment of FIG. 1, the optical communication system comprises erbium-doped fiber amplifiers (EDFAs) on both sides of the optical transmission links OTL1 and OTL2. If an optical fiber amplifier EDFA1 at the remote-end location, REL, of the first optical link OTL1 does not receive input power, e.g. due to a fiber break, it shuts down and sends a shutdown signal to the optical fiber amplifier EDFA2 of the other optical transmission link OTL 2 provided at the same location. The optical fiber amplifier EDFA2 at the second optical transmission link OTL 2 shuts down due to the received shutdown signal. As a consequence, the optical fiber amplifier EDFA3 at the other end of the second optical transmission link OTL 2 does not receive input power. This results in that the affected optical fiber amplifier EDFA3 shuts down and sends a shutdown signal to an optical fiber amplifier EFDA 4 of the first optical transmission link OTL1 provided on the same end. This optical fiber amplifier EDFA4 shuts down due to the received shutdown signal. Since no signal power is then transmitted over the first optical transmission link OTL1, laser safety is ensured. Such a laser safety mechanism can be used to perform a fiber integrity monitoring. However, the conventional fiber integrity monitoring mechanism as illustrated in FIG. 1 does not include an optical fiber used for power supply of a remote optical power amplifier.

SUMMARY OF THE INVENTION

Accordingly, it is an object of the present invention to provide a bidirectional optical communication link, which offers low latency for high-speed data communication applications over long distances and where a laser safety mechanism can be implemented.

This object is achieved according to a first aspect of the present invention by a bidirectional optical communication link comprising the features of claim 1.

The invention provides according to a first aspect an optical communication link comprising
  a first optical transmission link, OTL1, adapted to transmit an optical signal from a near-end location, NEL, via a first optical fiber to a remote-end location, REL, and
  a second optical transmission link, OTL 2, adapted to transmit an optical signal from the remote-end location, REL, via the second optical fiber to the near-end location, NEL, wherein at least one of the optical transmission links comprises a remote optically pumped amplifier, ROPA, having a gain medium which is pumped with pump light received by said gain medium through a third optical fiber from a pump laser source provided at the near-end location, NEL, or provided at the remote-end location, REL, to supply the gain medium of the remote optical pump amplifier with pump power.

In a possible embodiment of the optical communication link according to the first aspect of the present invention, the first optical fiber and the second optical fiber comprise a hollow core fiber, HCF.

The provision of hollow core fibers, HCFs, offers low signal latency for high-speed data signal communication.

In a further possible embodiment of the optical communication link according to the first aspect of the present invention, the gain medium of the remote optical pump amplifier, ROPA, comprises a glass fiber, which is doped with bismuth or rare earth ions. These rare earth ions can comprise erbium, neodymium, dysprosium, ytterbium, praseodymium or thulium.

In a possible embodiment of the optical communication link according to the first aspect of the present invention, the third optical fiber spans from the near-end location, NEL, to the remote-end location, REL, along the first optical fiber and along the second optical fiber within a common cable.

This allows for using a uniform design of the cable over the complete length of the optical communication link. Consequently, only small modification of existing equipment is required.

In a further possible embodiment of the optical communication link according to the first aspect of the present invention, an optical detector is provided at the remote-end location, REL, and is adapted to receive the pump light through the third optical fiber.

In a still further possible alternative embodiment, the optical detector is provided at the near-end location, NEL, and is adapted to receive the pump light through the third optical fiber.

In a further possible embodiment of the optical communication link according to the first aspect of the present invention, the optical detector is adapted to detect residual pump power leaving the gain medium of the at least one remote optically pumped amplifier or to detect a portion of the pump power branched off close to the remote optically pumped amplifier.

In a still further possible embodiment, the optical detector is adapted to detect an optical fiber integrity indication signal transmitted through the third optical fiber and indicating an integrity of the third optical fiber.

In a further possible embodiment of the optical communication link according to the first aspect of the present invention, a wavelength of the optical fiber integrity indication signal transmitted through the third optical fiber is different from a pump wavelength of the pump light propagating through the third optical fiber.

In a still further possible embodiment of the optical communication link according to the first aspect of the present invention, the optical detector is adapted to trigger automatically a shutdown signal if a failure of the third optical fiber is detected by the optical detector.

In a still further possible embodiment of the optical communication link according to the first aspect of the present invention, first fiber amplifiers are provided at the near-end and/or at the remote-end of the first optical transmission link and second fiber amplifiers are provided at the near-end and/or at the remote-end of the second optical transmission link.

In a still further possible embodiment of the optical communication link according to the first aspect of the present invention, the shutdown signal triggered by the optical detector is applied to a fiber amplifier provided at the same location as the optical detector to shut down the respective fiber amplifier and to interrupt the corresponding optical transmission link.

In a still further possible embodiment of the optical communication link according to the first aspect of the present invention, the gain medium of the remote optically pumped amplifier provided in an optical transmission link receives pump light branched off from the third optical fiber by means of an associated optical coupler.

In a still further possible embodiment of the optical communication link according to the first aspect of the present invention, the first optical transmission link, OTL1, comprises a first remote optically pumped amplifier, 3-1, having a gain medium which is pumped with pump light with a first light wavelength received by the gain medium of the first remote optical pump amplifier from a first pump laser source provided at the near-end location, NEL, to supply the gain medium of the first remote optically pumped amplifier with pump power, and wherein the second optical transmission link, OTL 2, comprises a second remote optically pumped amplifier, 3-2, having a gain medium which is pumped with pump light with a second light wavelength received by the gain medium of the second remote optically pumped amplifier from a second pump laser source at the remote-end location to supply the gain medium of a second remote optically pumped amplifier with pump power.

In a further possible embodiment of the optical communication link according to the first aspect of the present invention, the third optical fiber comprises a standard fiber. Such fibers typically have a sufficiently low attenuation at the wavelength of the pump light.

In a still further possible embodiment of the optical communication link according to the first aspect of the present invention, the optical coupler comprises a wavelength division multiplexing (WDM) coupler.

The invention provides according to a further aspect an optical communication system comprising the features of claim 16.

The invention provides according to the second aspect an optical communication system comprising at least one optical communication link according to the first aspect of the present invention to provide communication between a first transceiver provided at the near-end location, NEL, and a second transceiver provided at the remote-end location, REL.

The invention provides to a further aspect a method for ensuring laser safety in a bidirectional optical communication link according to the first aspect of the present invention, wherein the method is characterized in that a laser safety shutdown signal is generated in case a detector adapted to detect part of the pump power provided to at least one remote optically pumped amplifier in the optical communication link leaving the gain medium or being branched off before providing pump power to the remote optically pumped amplifier does not receive a sufficient level of pump power.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 1:
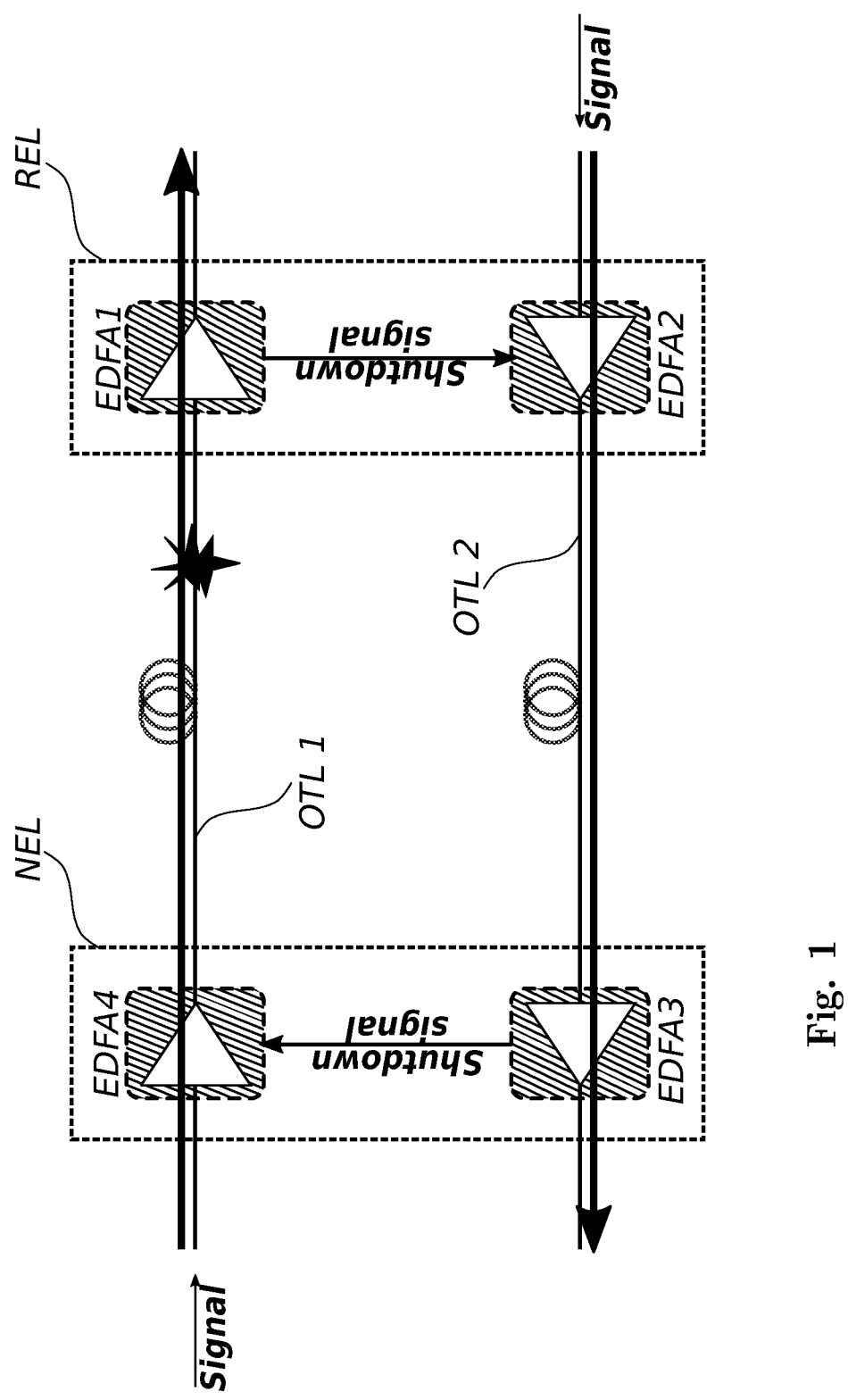
FIG. 1 shows a standard laser safety shutdown mechanism used in a conventional fiber optical system.
Figure 2:
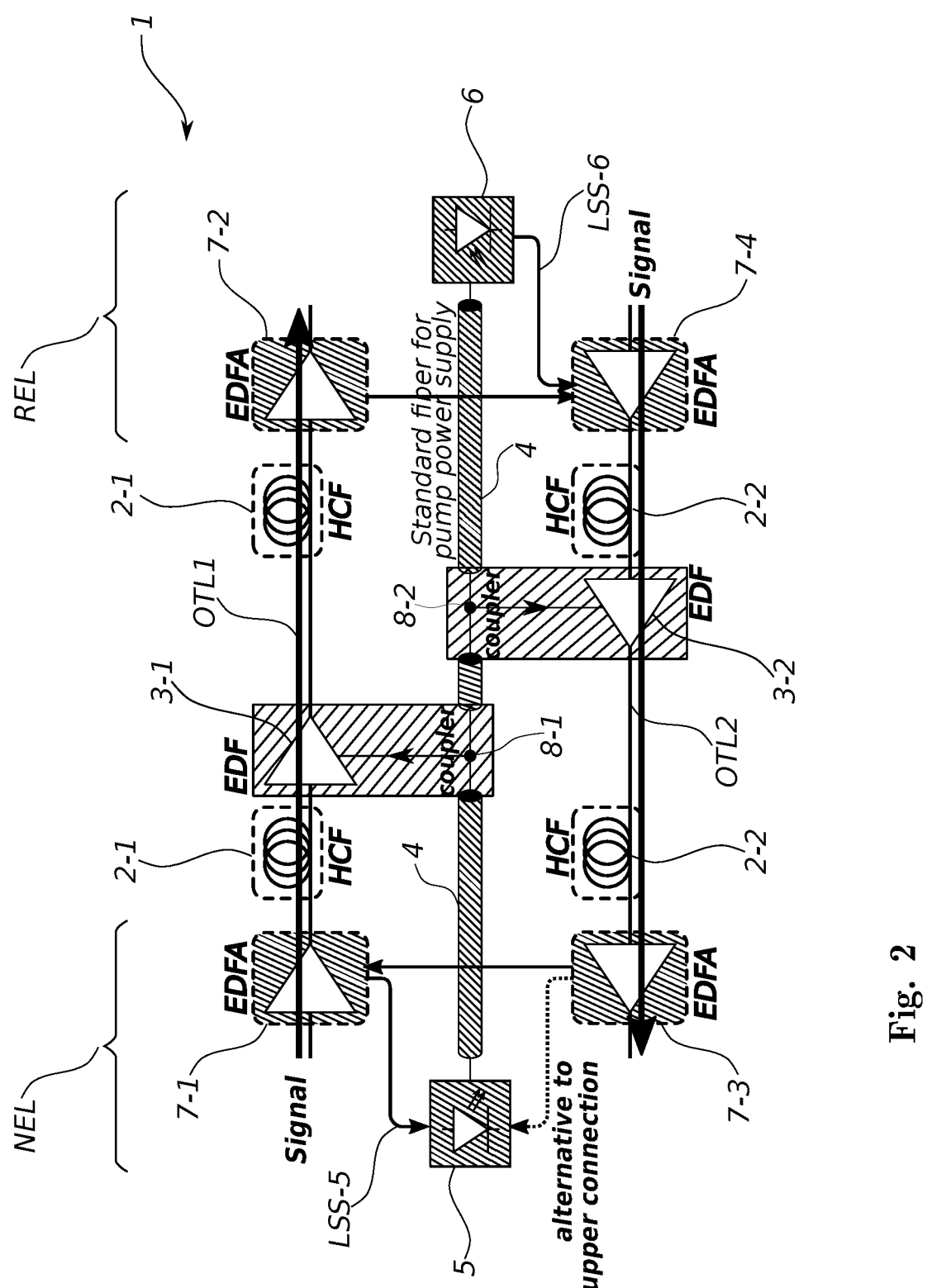
FIG. 2 illustrates a possible embodiment of an optical communication link according to the present invention.

As can be seen from the schematic diagram illustrated in FIG. 2, the bidirectional optical communication link (OCL) 1 according to the first aspect of the present invention includes a first (unidirectional) optical transmission link OTL1 and a second (unidirectional) optical transmission link OTL2. The first optical transmission link OTL1 is adapted to transmit an optical signal from a near-end location, NEL, via a first optical fiber 2-1 to a remote-end location, REL. The second optical transmission link OTL2 is adapted to transmit separately an optical signal in opposite direction from a remote-end location, REL, via a second optical fiber 2-2 to the near-end location, NEL.

The bidirectional optical communication link (OCL) 1 provides bidirectional data transmission between two network nodes of an optical communication system. Each network node can comprise a transceiver connected via the optical communication link 1 to a transceiver of another network node located at the opposite remote end of the optical communication link 1. In the illustrated embodiment, both optical transmission links OTL1, OTL2 comprise a remote optically pumped amplifier (ROPA) 3-1, 3-2 having a gain medium GM which is pumped with pump light received by the respective gain medium through a third optical fiber 4 from a pump laser source 5. In the illustrated embodiment of FIG. 2, the pump laser source 5 is located at the near-end location, NEL, of the bidirectional optical communication link 1. The pump laser source 5 is adapted to supply the gain medium of the remote optically pumped amplifiers (ROPAs) 3-1, 3-2 with pump power. The gain medium of the remote optically pumped amplifiers 3-1, 3-2 comprises a glass fiber doped with bismuth or rare earth ions. The rare earth ions can comprise for instance erbium, neodymium, dysprosium, ytterbium, praseodymium or thulium. In the illustrated embodiment of FIG. 2, the gain medium of the remote optically pumped amplifiers 3-1, 3-2 comprises erbium. In the embodiment illustrated in FIG. 2, the gain medium of the remote optically pumped amplifiers 3-1, 3-2 are formed by a glass fiber doped with erbium (EDF, erbium-doped fiber).

In a possible embodiment, the pump laser source 5 can be formed by a laser diode. In the illustrated embodiment of FIG. 2, the pump power is supplied to both remote optically pumped amplifiers 3-1, 3-2 via an additional optical fiber 4 that spans from one end of the optical transmission link to the other end as shown in FIG. 2. A part of the pump power launched into the third optical fiber 4 at one fiber end or the residual pump power from the other remote optically pumped amplifier can be detected by a detector 6 placed at the other end of the additional optical fiber 4. In case of an interruption of the third optical fiber 4, the detector 6 can automatically trigger a laser shutdown as also illustrated in FIG. 2 by the signal LSS-6.

In the embodiment illustrated in FIG. 2, the first optical fiber 2-1 and the second optical fiber 2-2 can comprise hollow core fibers (HCFs). A hollow core fiber HCF is an optical fiber that guides the signal light essentially within a hollow region so that only a minor portion of the optical power does propagate in a solid fiber material such as glass. There are different possible designs for hollow core fibers HCFs such as a so-called revolver design or a design with nested rings. The signal propagation losses of hollow core fibers HCFs are higher than for solid core optical fibers, in particular when single-mode guidance is required. The third optical fiber 4 used for transmission of the pump light does span from the near-end location, NEL, to the remote-end location, NEL, along the first optical fiber 2-1 and along the second optical fiber 2-2 in a common cable. The third optical fiber 4 can comprise in a possible embodiment a standard fiber for pump power supply having a low attenuation at the wavelength of the pump light. In the illustrated embodiment of FIG. 2, the optical detector 6 is provided at the remote-end location and is adapted to receive the pump light through the third optical fiber 4.

If the detector 6 is adapted to perform a pump monitoring and does not detect power, it can send a shutdown signal, LSS-6, to any of the two fiber amplifiers 7-2, 7-4 at the respective location as illustrated in FIG. 2. The optical communication link 1 connects in a possible embodiment a first transceiver provided at a near-end location, NEL, of a first network node with a second transceiver at a remote-end location, REL, of a second network node. A pair of first fiber amplifiers 7-1, 7-3 can be provided at the near-end location, NEL, and a second pair of fiber amplifiers 7-2,7-4 can be provided at the remote-end location, REL. The first fiber amplifier 7-1 is provided at the input side of the first optical transmission link OTL1 to receive an optical signal from the first transceiver at the near-end location, NEL, i.e. at the location of the first network node. The second fiber amplifier 7-2 is provided at the output side of the first optical transmission link OTL1, i.e. at the location of the second transceiver provided at the second network node. A third optical amplifier 7-3 is provided at the output side of the second optical transmission link OTL2 at the transceiver of the first network node provided at the near-end location, NEL, of the bidirectional optical communication link (OCL) 1. A fourth fiber amplifier 7-4 is provided at the input side of the second optical transmission link OTL2, i.e. at the location of the transceiver of the second network node forming the remote-end location, REL, of the optical communication link (OCL) 1 illustrated in FIG. 2. In a possible embodiment, the fiber amplifiers 7-1, 7-2, 7-3, 7-4 are formed by EDFAs.

In the illustrated embodiment of FIG. 2, the detector 6 is provided at the remote-end location, REL, of the optical communication link (OCL) 1, i.e. at the location of the remote-end transceiver of the second network node. In the bidirectional optical communication link 1 shown in FIG. 2, a supervision of the additional optical fiber 4 can be included by adding two communication paths. In case that the detector 6 performing the pump monitoring does not detect power, it does send a shutdown signal, LSS-6, to any of the two EDFAs 7-2, 7-4 at the respective location of the detector 6 as illustrated in FIG. 2. In the illustrated implementation of FIG. 2, the detector 6 sends a shutdown signal, LSS-6, to the fourth fiber amplifier 7-4 at the input of the second optical transmission link OTL2. The third fiber amplifier 7-3 at the other end of the respective second optical fiber OTL2 sends in turn a shutdown signal, LSS-5, to the pump laser source 5 at the near-end location, NEL, of the optical communication link (OCL) 1. In a preferred embodiment, this can be done by the booster amplifier. The shutdown signal LSS-6 triggered by the optical detector 6 is applied in the illustrated embodiment of FIG. 2 to the fourth fiber amplifier 7-4 provided at the same location as the optical detector 6 to shut down the respective fiber amplifier 7-4 and consequently interrupting the corresponding second optical transmission link OTL2.

The gain medium of the remote optically pumped amplifiers 3-1, 3-2 provided in the optical transmission links OTL1, OTL2 can receive pump light branched off from the third optical fiber 4 by means of associated optical couplers 8-1, 8-2 as shown in FIG. 2. In a possible embodiment, the optical couplers 8-1, 8-2 can also be formed by wavelength division multiplexing (WDM) couplers when using more than one pump wavelength.

In case that the attenuation of the pump light within the standard optical fiber 4 is too high, laser safety can also be assured by an additional wavelength propagating within the standard optical fiber 4 for power supply at smaller attenuation as compared with the pump signal.

In a possible embodiment, the optical detector 6 can be adapted to detect an optical fiber integrity indication signal (OFIIS) transmitted through the additional third optical fiber 4 and indicating an integrity of the third optical fiber 4. The wavelength of the optical fiber integrity indication signal (OFIIS) transmitted through the third optical fiber 4 is different from a pump wavelength of the pump light propagating through the third optical fiber 4. In a possible embodiment, the optical detector 6 is adapted to trigger automatically a shutdown signal if a failure, in particular an interruption, of the third optical fiber 4 is detected by the optical detector 6.

Figure 3:
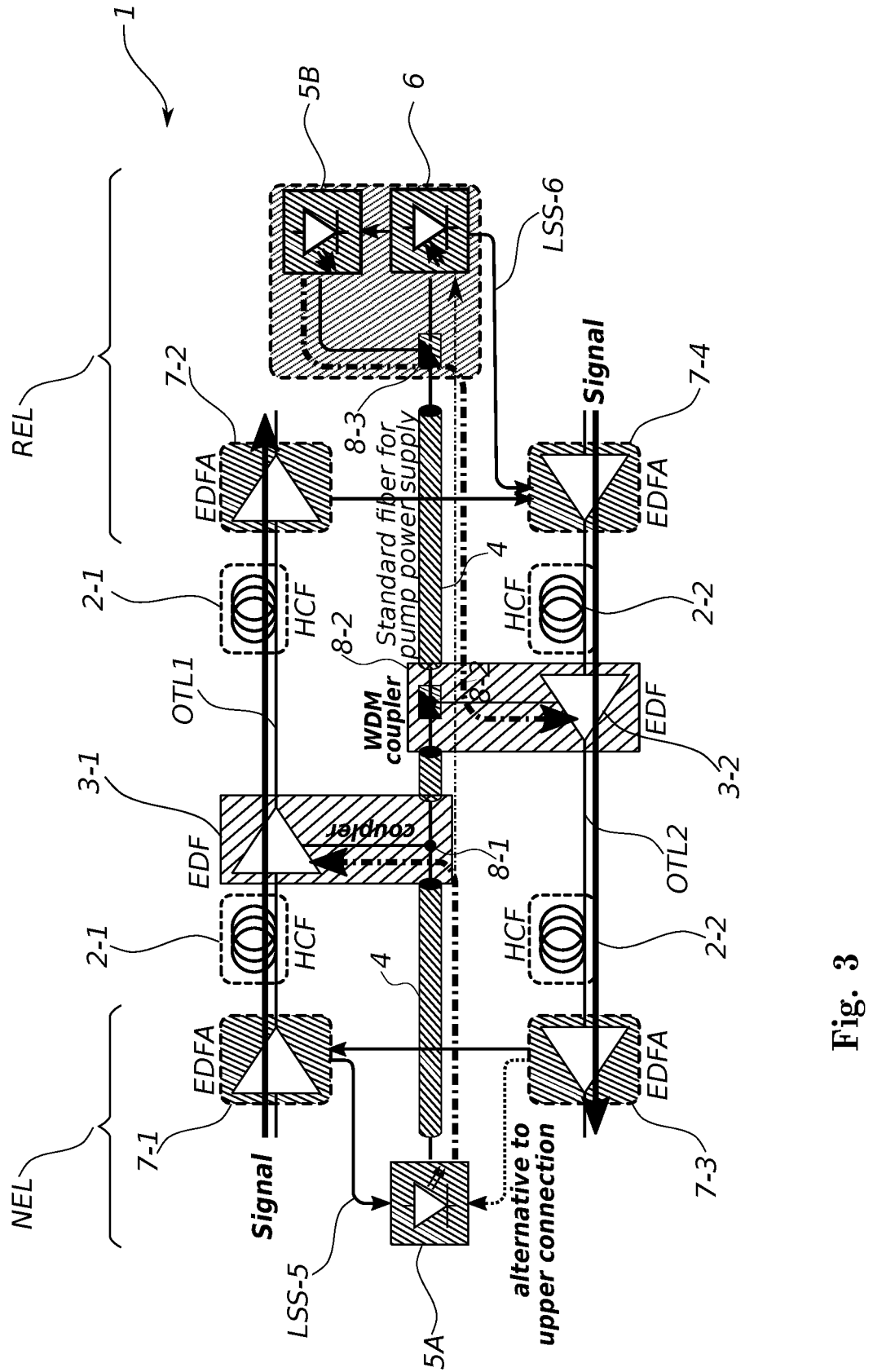
FIG. 3 illustrates a further possible exemplary embodiment of an optical communication link according to the present invention.

FIG. 3 shows a further exemplary embodiment of the bidirectional optical communication link (OCL) 1 according to the present invention where a pump power is supplied from both sides of the bidirectional optical communication link 1 having a first optical transmission link OTL1 for a first optical signal propagating in a first direction and having a second optical transmission link OTL2 for a second optical signal propagating in an opposite second direction. In the illustrated embodiment of FIG. 3, the bidirectional optical communication link (OCL) 1 comprises a first pump laser source 5A provided at the near-end location, NEL, and a second laser pump source 5B provided at the remote-end location, REL. In the illustrated embodiment, the detector 6 is also provided at the remote-end location, i.e. on the far end of the optical communication link 1. The detector 6 and the second laser pump source 5B can be connected to the far end of the third fiber 4 by means of a wavelength division multiplexing (WDM) coupler 8-3 as illustrated in FIG. 3.

The first optical transmission link OTL1 of the bidirectional optical communication link 1 comprises a first remote optically pumped amplifier 3-1 having a gain medium which is pumped with pump light with a first pump light wavelength received by the gain medium of the first remote optically pumped amplifier 3-1 from the first pump laser source 5A provided at the near-end location, NEL, to supply the gain medium of the first remote optically pumped amplifier 3-1 with pump power. Further, the second optical transmission link OTL2 of the bidirectional communication link 1 comprises a second remote optically pumped amplifier 3-2 having a gain medium which is pumped with pump light with a second pump light wavelength received by the gain medium of the second remote optically pumped amplifier 3-2 from the second pump laser source 5B at the remote-end location, REL, to supply the gain medium of the second remote optically pumped amplifier 3-2 with pump power. In the illustrated implementation of FIG. 3, the second coupler 8-2 is formed by a WDM coupler.

Figure 4:
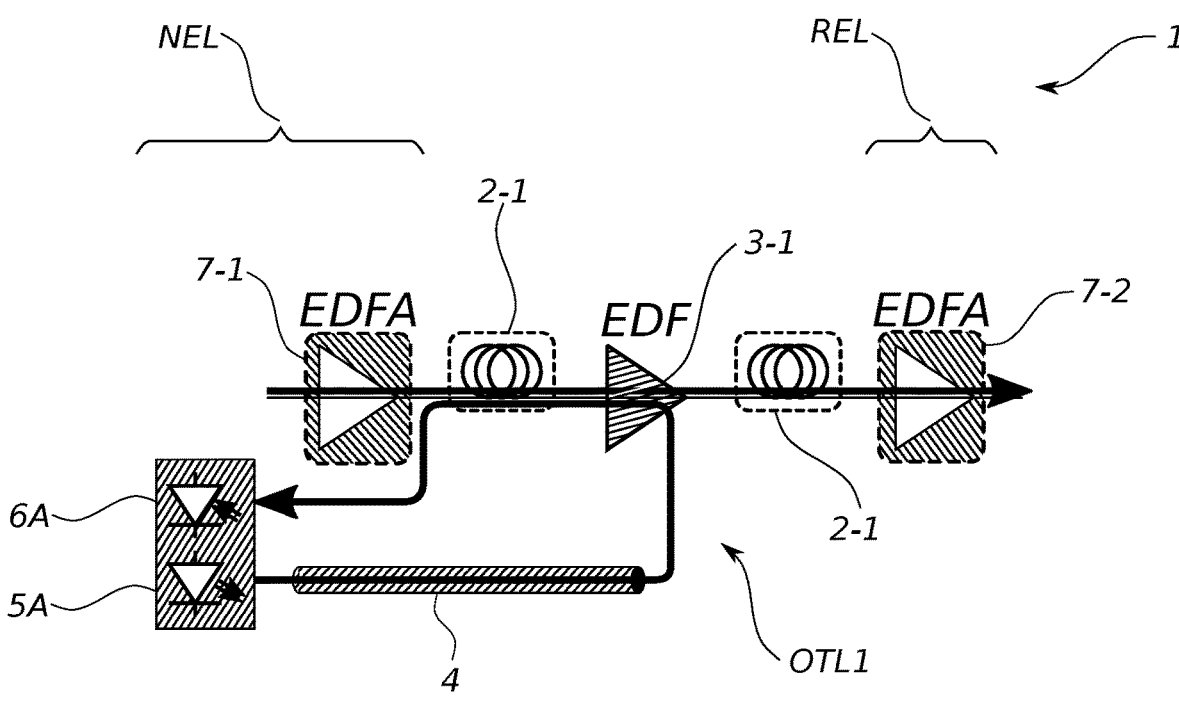
FIG. 4 illustrates a further exemplary embodiment of an optical communication link according to the present invention.

FIG. 4 shows a further exemplary embodiment of an optical communication link 1 according to the present invention. In the illustrated embodiment of FIG. 4, the detector 6A is provided at the same side as the pump laser source 5A. In case the attenuation of the hollow core fiber HCF forming the optical fiber 2-1 for data signal transmission is small enough at the pump laser light wavelength, it is also possible to guide residual pump power from the EDF coil forming the gain medium of the remote optically pumped amplifier 3-1 back to the location of the pump laser source 5A and to monitor the fiber integrity of the additional fiber 4 dedicated to the pump power supply there as illustrated in FIG. 4.

Figure 5:
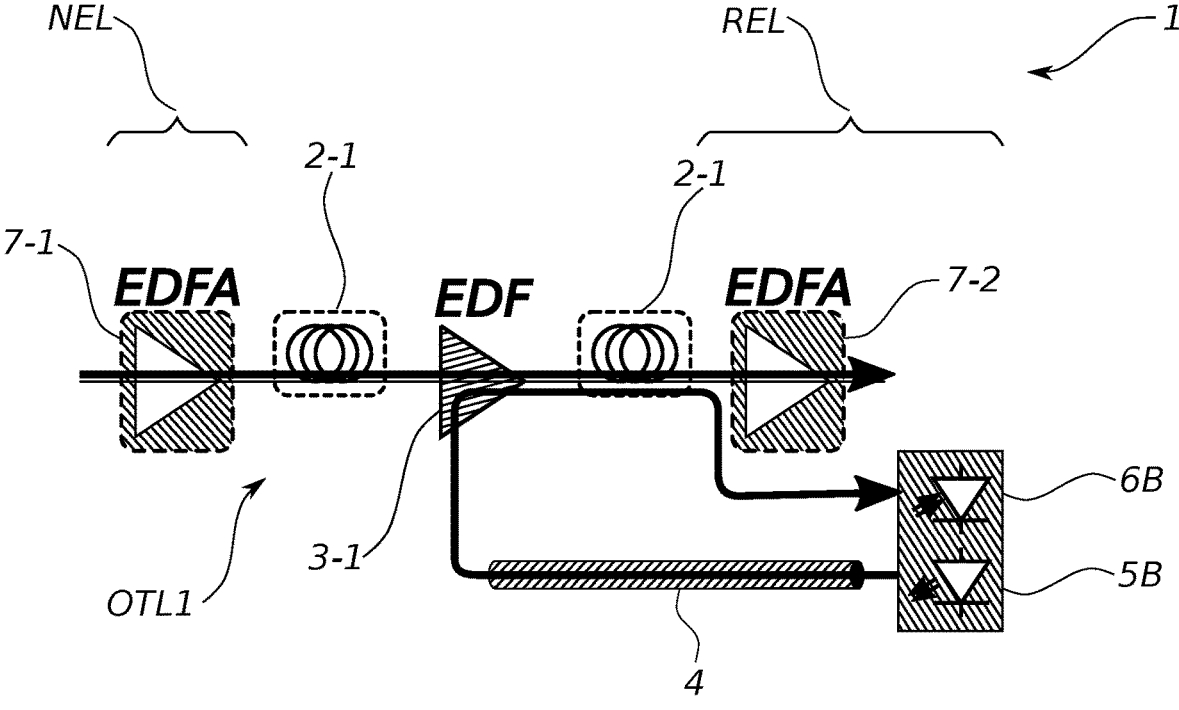
FIG. 5 illustrates a further exemplary embodiment of an optical communication link according to the present invention.

In the embodiment illustrated in FIG. 5, the monitoring of the fiber integrity of the fiber 4 is performed at the remote-end location, REL, of the optical communication link 1 where a pump laser source 5B and a detector 6B is provided. The residual power of the EDF coil of the remote optically pumped amplifier 3-1 is guided back via the HCF 2-1 to the detector 6B being provided at the same location as the pump laser source 5B.

Figure 6:
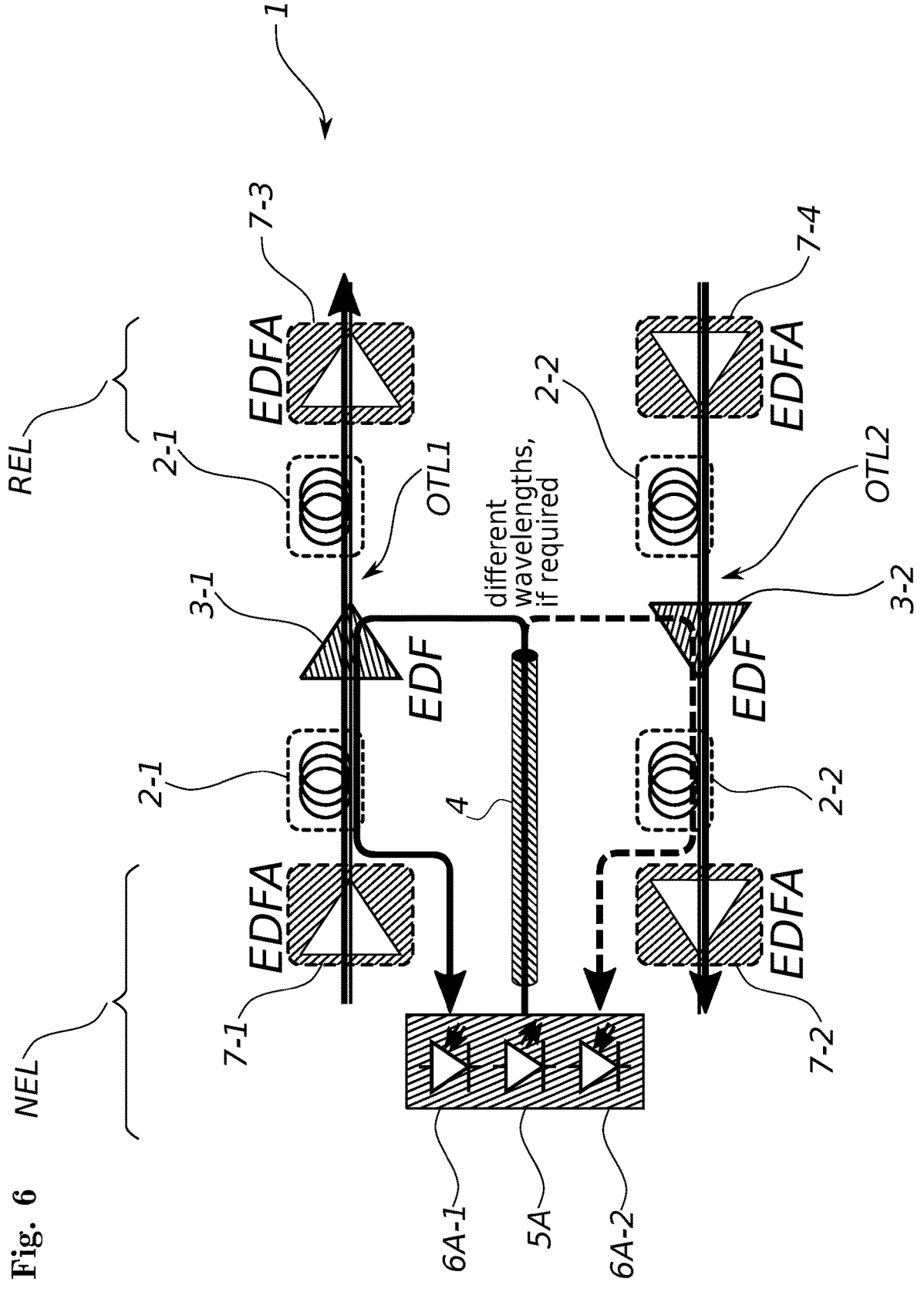
FIG. 6 illustrates a further exemplary embodiment of an optical communication link according to the present invention.

FIG. 6 illustrates a further exemplary embodiment of the bidirectional optical communication link (OCL) 1 where a fiber integrity monitoring of the optical fiber 4 is achieved by looping back the residual pump power over the HCFs 2-1, 2-2 of both optical transmission links OTL1, OTL2 to the near-end location, NEL, of the pump power source 5A. For this purpose, two separate optical detectors 6A-1, 6A-2 are provided at the same location as the pump power source 5A to monitor the looped-back residual pump power and to monitor the fiber integrity of the additional fiber 4 dedicated for the pump power supply of the remote optically pumped amplifiers 3-1, 3-2. If no residual pump power can be detected by the detectors 6A-1, 6A-2, the fiber integrity of the additional fiber 4 is possibly compromised. Instead of the residual pump power, part of the pump power branched off from the pump supply path before the respective ROPAs 3-1 and 3-2 can be looped-back. The two monitors are used for redundancy, although one monitor would be sufficient.

Figure 7:
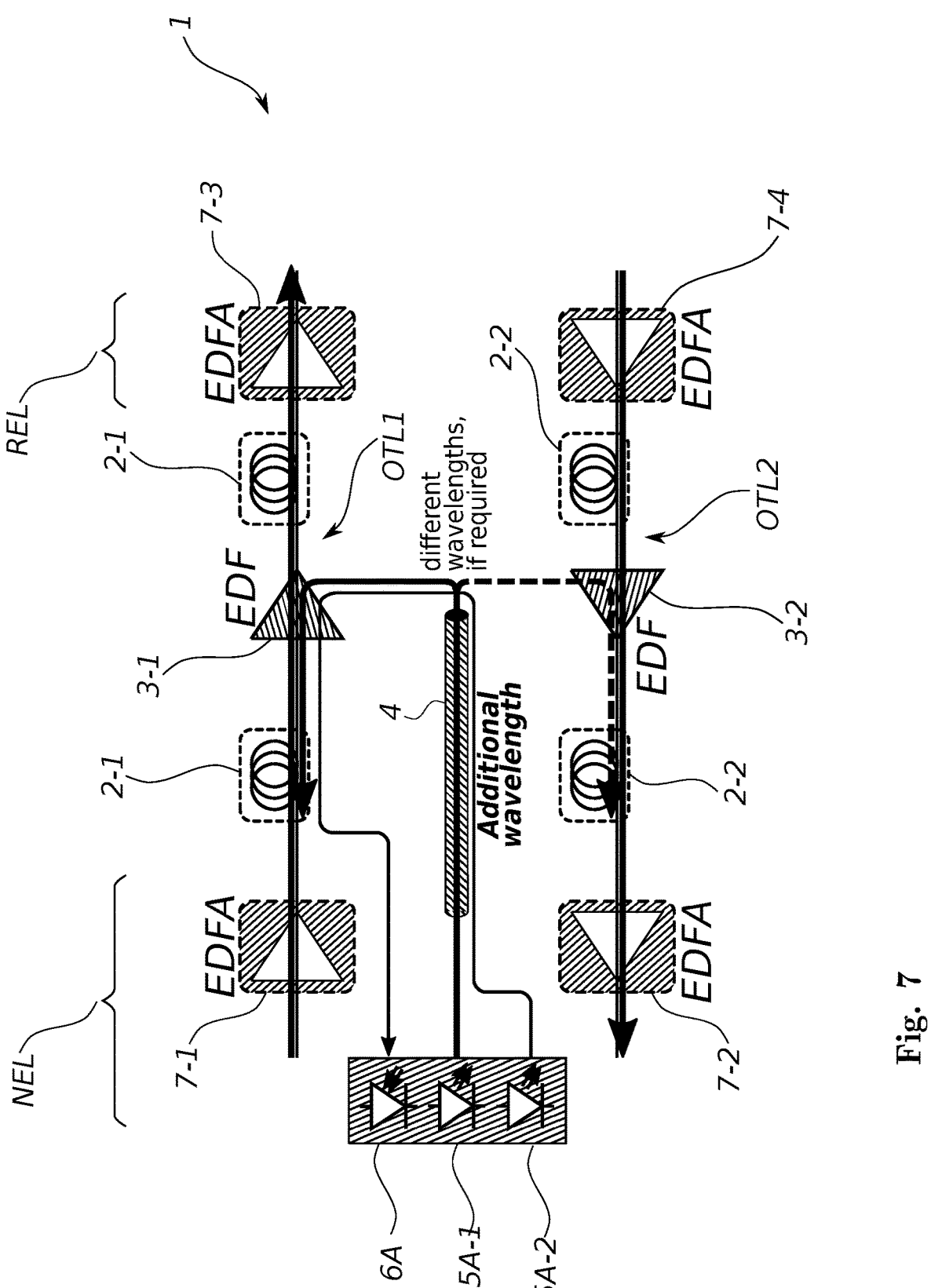
FIG. 7 illustrates a further exemplary embodiment of an optical communication link according to the present invention.

Alternatively, a second wavelength, for instance in the L-band, can be used for ensuring fiber integrity as also illustrated in the embodiment of FIG. 7. In this case, WDM couplers can be required to direct lightwaves at the pump wavelength and in the L-band to the same output power.

Further embodiments are possible. For example, guiding back the residual pump power can be realized by means of a further optical fiber. However, this embodiment does lead to an asymmetric cable structure (two HCFs and two standard fibers up to the second EDF and two HCFs in the remainder of the cable). Furthermore, the residual pump power can also be guided to the end opposite to the pump laser source wherein it propagates within the HCF from the section starting at the second remote optical pump amplifier 3-2.

The invention provides according to a further aspect an optical communication system using at least one bidirectional optical communication link (OCL) 1 as illustrated in the embodiments of FIGS. 2 to 7 to provide communication between a first transceiver provided at a near-end location, NEL, and a second transceiver provided at a remote-end location, REL.

According to a further aspect, the invention provides a method for ensuring laser safety in a bidirectional optical communication link 1 as illustrated in the embodiments of FIGS. 2 to 7 to provide communication between a first transceiver provided at a near-end location, NEL, and a second transceiver provided at a remote-end location, REL, by detecting part of the pump power provided to at least one ROPA in the optical communication link leaving the gain medium or being branched off before providing pump power to the ROPA. In case the detected pump power falls below a predefined threshold, a laser safety shutdown is generated that triggers the shutdown of the bidirectional optical communication link 1.

The optical communication system includes a bidirectional optical communication link 1 having first and second transmission links OTL1, OTL2 extending between a first location and a second location. The first optical transmission link OTL1 is configured to transmit an optical signal, in particular a data signal, from the first location to the second location. The second transmission link OTL2 is configured to transmit an optical signal, in particular a data signal, from the second location to the first location. At least one of the optical transmission links OTL1, OTL2 comprises a remote optically pumped amplifier 3 comprising a gain medium. The gain medium is configured to be pumped by an optical pump power which can be generated at the first location or at the second location. The generated pump power is guided from the location of its generation to the remote optically pumped amplifier 3 by an additional fiber 4.

A detector 6 can be located close to any of the first or second location and receives a residual pump power leaving the gain medium or a part of the pump power branched off close to the remote optically pumped amplifier 3.

The detector 6 monitoring the pump power is connected in a possible embodiment to an apparatus ensuring fiber integrity of the optical communication link 1. The detector 6 can be configured to trigger a shutdown of the bidirectional optical communication link 1 when detecting a failure of the additional fiber 4 providing the pump power to the remote optically pumped amplifier 3. The optical communication link 1 can be integrated in an optical cable having a symmetric cable structure. The optical cable can comprise a uniform design over the complete length of the cable thus requiring only minor modifications of the used equipment.

The illustrated embodiments shown in FIGS. 2 to 7 are only exemplary, i.e. there can be variations within the scope of the claims. For example, other kinds of optical fibers than hollow core fibers (HCFs) can be used for signal transmission of the optical signals via the optical transmission links OTL1, OTL2. Due to the progress in the manufacturing of hollow core fibers and the related decrease of their attenuation, using a remote optically pumped amplifiers in only one of the optical transmission links OTL1, OTL2 is also a realistic scenario and is within the scope of the presented inventive concept.

Further, the number of remote optically pumped amplifiers 3 along the optical communication link can vary depending on the use case. In the illustrated embodiments, a single remote optically pumped amplifier 3 is used in each of the two optical transmission links OTL1, OTL2. Further, additional remote optically pumped amplifiers can be provided thus extending the transmission range of the optical communication link 1.

Further, in a preferred embodiment, a single additional third optical fiber 4 is used to supply pump power for the remote optically pumped amplifiers 3 provided in the two optical transmission links OTL1, OTL2. In a further possible embodiment, each of the remote optically pumped amplifiers 3-*i* of the different optical transmission links OTL1, OTL2 can be supplied with pump power with an associated third optical fiber 4-*i*. In this implementation, the remote optical amplifiers 3-1 of the first optical transmission link OTL1 can comprise an associated additional optical fiber 4-1 to receive pump power from an associated first pump laser source 5-1 whereas the remote optically pumped amplifiers 3-2 of the other second optical transmission link OTL2 can receive pump power through an associated third optical fiber 4-2 from an associated second pump laser source 5-2. In this embodiment, the cable comprising the two optical transmission links OTL1, OTL2 includes four fibers, i.e. a first optical fiber 3-1, a second optical fiber 3-2 and two associated additional optical fibers 4-1, 4-2. Further, the features of the different embodiments in FIG. 2 to FIG. 7 can be combined with each other. In a further possible implementation, the pump laser wavelength of the pump light generated by the pump laser sources 5 can be adjusted depending on the use case.

LIST REFERENCE SIGNS

1 Optical communication link
2-1 First optical fiber
2-2 Second optical fiber
3-1 First remote optically pumped amplifier
3-2 Second remote optically pumped amplifier
4 Optical fiber
4-1 Optical fiber
4-2 Optical fiber
5 Laser source
5A Pump laser source
5A-1 Pump laser source
5A-2 Laser source
5B Pump laser source
6 Optical detector
6A Optical detector
6A-1 Optical detector
6A-2 Optical detector
6B Optical detector
7-1 Fiber amplifier
7-2 Fiber amplifier
7-3 Fiber amplifier
7-4 Fiber amplifier
8-1 Optical coupler
8-2 Optical coupler
8-3 Wavelength division multiplexing coupler
EDFA1 First EDFA at remote-end location
EDFA2 Second EDFA at remote-end location
EDFA3 First EDFA at near-end location
EDFA4 Second EDFA at near-end location
GM Gain medium
LSS Laser shutdown signal
LSS-5 Laser shutdown signal sent to pump laser source
LSS-6 Laser shutdown signal triggered by optical detector
NEL Near-end location
OTL1 First optical transmission link
OTL2 Second optical transmission link

What is claimed is:

1. A bidirectional optical communication link comprising:
 a first optical transmission link adapted to transmit an optical signal from a near-end location via a first optical fiber to a remote-end location; and
 a second optical transmission link adapted to transmit an optical signal from the remote-end location via a second optical fiber to the near-end location;
wherein at least one of the optical transmission links comprises a remote optically pumped amplifier having a gain medium which is pumped with pump light received by said gain medium through a third optical fiber from a pump laser source provided at the near-end location or provided at the remote-end location to supply the gain medium of the remote optically pumped amplifier with pump power, and comprising
an optical detector provided at the remote-end location or provided at the near-end location and adapted to receive the pump light through the third optical fiber,
wherein the optical detector is adapted to trigger automatically a laser safety shutdown signal if a failure or interruption of the third optical fiber is detected by the optical detector to shut down the bidirectional optical communication link.

2. The optical communication link according to claim 1, wherein the first optical fiber and the second optical fiber comprise a hollow core fiber, HCF.

3. The optical communication link according to claim 1, wherein the gain medium of the remote optical pump amplifier comprises a glass fiber doped with bismuth or with rare earth ions comprising erbium, neodymium, dysprosium, ytterbium, praseodymium or thulium.

4. The optical communication link according to claim 1, wherein the third optical fiber spans from the near-end location to the remote-end location along the first optical fiber and along the second optical fiber within a common cable.

5. The optical communication link according to claim 1, wherein the optical detector is adapted to receive part of the pump light that has been generated at the opposite location of the optical communication link.

6. The optical communication link according to claim 1, wherein the optical detector is adapted to detect residual pump power leaving the gain medium of the remote optically pumped amplifier or to detect a portion of the pump power branched off close to the remote optically pumped amplifier.

7. The optical communication link according to claim 1, wherein the optical detector is adapted to detect an optical fiber integrity indication signal transmitted through the third optical fiber and indicating an integrity of the third optical fiber.

8. The optical communication link according to claim 7, wherein a wavelength of the optical fiber integrity indication signal transmitted through the third optical fiber is different from a pump wavelength of the pump light propagating through the third optical fiber.

9. The optical communication link according to claim 1, wherein fiber amplifiers are provided at the near-end and/or at the remote-end of the first optical transmission link and wherein fiber amplifiers are provided at the near-end and/or at the remote-end of the second optical transmission link.

10. The optical communication link according to claim 1, wherein the shutdown signal triggered by the optical detector is applied
 to a fiber amplifier provided at the same location as the optical detector to shut down the respective fiber amplifier and to interrupt launching signals into the corresponding optical transmission link,
 or is applied to a fiber amplifier provided at the same location as the optical detector and configured to send a shutdown signal to a fiber amplifier launching signals into the optical transmission link of opposite direction.

11. The optical communication link according to claim 1, wherein the gain medium of the remote optically pumped amplifier provided in an optical transmission link receives pump light branched off from the third optical fiber by means of an associated optical coupler.

12. The optical communication link according to claim 1, wherein the first optical transmission link comprises a first remote optically pumped amplifier having a gain medium which is pumped with pump light with a first light wavelength received by the gain medium of the first remote optically pumped amplifier from a first pump laser source provided at the near-end location to supply the gain medium of the first remote optically pumped amplifier with pump power, wherein the second optical transmission link comprises a second remote optically pumped amplifier having a gain medium which is pumped with pump light with a second light wavelength received by the gain medium of the second remote optically pumped amplifier from a second pump laser source at the remote-end location to supply the gain medium of the second remote optically pumped amplifier with pump power.

13. The optical communication link according to claim 1, wherein the third optical fiber comprises a standard fiber having at the wavelength of the pump light a lower attenuation than the respective transmission fiber.

14. The optical communication link according to claim 11, wherein the optical coupler comprises a wavelength division multiplexing, WDM, coupler.

15. An optical communication system comprising at least one optical communication link according to claim 1 to provide communication between a first transceiver provided at the near-end location and a second transceiver provided at the remote-end location.

16. A method for ensuring laser safety in a bidirectional optical communication link according to claim 1, wherein a laser safety shutdown signal is generated in case the detector detects part of the pump power provided to at least one remote optically pumped amplifier in the bidirectional optical communication link leaving the gain medium of the remote optically pumped amplifier or being branched off before providing pump power to the remote optically pumped amplifier does not receive a sufficient level of pump power or does not receive a fiber integrity indication signal transmitted through the third optical fiber of the bidirectional optical communication link.

* * * * *